United States Patent

Yoshitake et al.

[15] 3,705,418

[45] Dec. 5, 1972

[54] DIGITAL PULSE SIGNAL TRANSMISSION CIRCUIT

[72] Inventors: Norito Yoshitake, Kawasaki-shi, Kanagawa-ken; Ryoji Imazeki, Yokohama-shi, Kanagawa-ken; Hiroshi Ishida, Kawasaki-shi, Kanagawa-ken, all of Japan

[73] Assignee: Fujitsu Limited, Kanagawa-Ken, Japan

[22] Filed: June 18, 1971

[21] Appl. No.: 154,496

[30] Foreign Application Priority Data

June 22, 1970 Japan ................................45/54251

[52] U.S. Cl. ..................307/237, 307/263, 307/268, 328/164

[51] Int. Cl. ................................................H03k 5/08

[58] Field of Search......307/208, 237, 246, 253, 263, 307/268; 328/164

[56] References Cited

UNITED STATES PATENTS

| | | | |
|---|---|---|---|
| 3,215,851 | 11/1965 | Warnock | 307/237 |
| 3,251,951 | 5/1966 | Meewezen | 307/237 X |
| 3,289,050 | 11/1966 | Duval | 307/237 X |
| 3,136,859 | 6/1964 | Leakey | 307/237 X |
| 3,506,854 | 4/1970 | Guzak, Jr. | 307/268 X |

FOREIGN PATENTS OR APPLICATIONS

| | | | |
|---|---|---|---|
| 986,850 | 3/1965 | Great Britain | 307/237 |

*Primary Examiner*—Stanley D. Miller, Jr.

[57] ABSTRACT

A digital pulse signal transmission line circuit is disclosed whose impedance is matched to the output impedance of the transmitter circuit for both an outflow current and an inflow current. An active element such as a transistor is connected in parallel with the input to the transmission line and a unidirectional switching means is connected in series with said transmission line so as to switch the transistor. When the outflow current flows, the unidirectional switching means generates a forward voltage drop due to said outflow current and this voltage drop cuts off the transistor. When the inflow current flows, the unidirectional switching means is cut off and said inflow current flows through the transistor which becomes conductive and causes the output impedance to decrease. As a result of this, the impedance of the digital pulse signal transmission line circuit is always matched to the output impedance of the transmitter circuit.

3 Claims, 8 Drawing Figures

DIGITAL PULSE SIGNAL TRANSMISSION CIRCUIT

The present invention relates to a digital signal transmission circuit used in, for example, the computer control system.

In the computer control system where long distances are maintained among the devices, the potential difference between the devices and ground and noise become important problems. The method for mitigating this effect is that both terminals of the transmission line are insulated from the ground. To realize this method, the data signal is applied to an oscillator and modulates said oscillator, and the modulated output is supplied via a transformer and a full wave rectifier circuit and a matching circuit to the transmission line. However, in this method, the diodes are included in the full wave rectifier circuit, and the impedance of these diodes changes for an outflow current and an inflow current. Therefore, it is very difficult to match the output impedance of the transmitter circuit to the impedance of the transmission line for both an outflow current and an inflow current. As a result, it is impossible to improve, at the same time, the rising characteristics and falling characteristics of the data signal.

The object of the present invention is to overcome the above-mentioned drawbacks.

Another object of the present invention is to improve the rising characteristics and falling characteristics by changing the output impedance of the transmitter circuit in accordance with the inflow current and the outflow current.

A further object of the invention is to provide an active element connected in parallel with the resistor which is connected between the output terminals of the transmitter circuit, the active element being provided with an unidirectional switching means which is connected in series with the transmission line and automatically controls said active element.

A still further object of the present invention is to provide a digital data transmission circuit which transmits the digital data efficiently without decreasing the output signal voltage and without the necessity of increasing the output power of the oscillator.

Further features and advantages of the present invention will be apparent from the ensuing description and the accompanying drawings to which, however, the scope of the invention is in no way limited.

Figure 1:
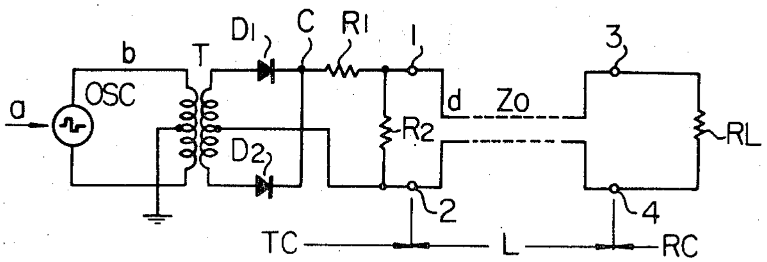
Fig. 1 PRIOR ART
Figure 2A:
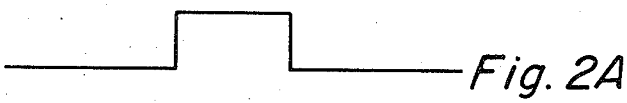
Figure 2B:
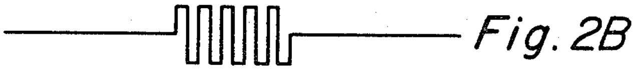
Figure 2C:
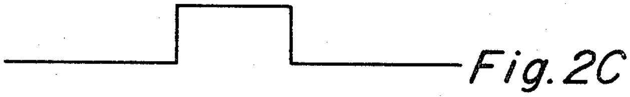
Figure 2D:
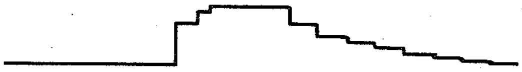
Figure 3:
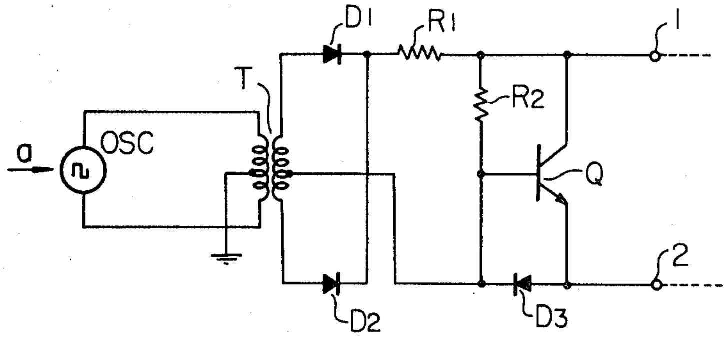
Figure 4A:
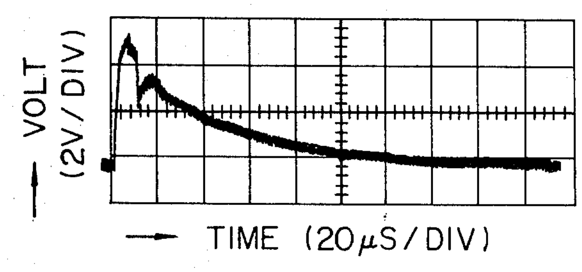
Fig. 4A PRIOR ART
Figure 4B:
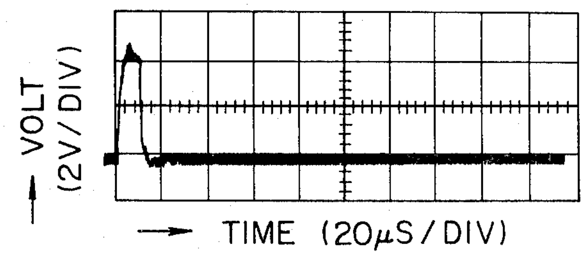

FIG. 1 is a schematic diagram of a conventional digital signal transmission circuit, FIG. 2–2D are diagrammatic views of the waveforms appearing at various points in the digital signal transmission circuit, FIG. 3 is a schematic diagram of the digital signal transmission circuit of the present invention, FIG. 4A shows the output waveform characteristics of the conventional digital signal transmission circuit, and FIG. 4B shows the output waveform characteristics of the digital signal transmission circuit according to the present invention.

In the conventional digital data transmission circuit shown in FIG. 1, a data signal shown in shown in FIG. 2A is applied to an oscillator OSC and the oscillator OSC is modulated by the data signal (a) and the output of the oscillator having a waveform shown in FIG. 2B is obtained in the primary winding of a transformer T. This modulated waveform FIG. 2B is supplied via the transformer T to a full wave rectifier circuit composed of diodes $D_1$ and $D_2$, and rectified by the diodes $D_1$ and $D_2$. The output of the full wave rectifier circuit shown in FIG. 2C is supplied to a matching circuit composed of resistors $R_1$ and $R_2$. The output of the matching circuit, that is, the output of the transmitter circuit TC is sent via a transmission line L having a characteristic impedance $Z_o$ to another device, that is a receiving circuit *RC* having a load *RL*. In the circuit shown in FIG. 1, the transmission line *L* is connected between the output terminals 1, 2 of the transmitter circuit TC and the input terminals 3, 4 of the receiving circuit *RC* and as shown in FIG. 1, said transmission line L is insulated from ground. Generally, for the purpose of reducing the required power of the transmitter circuit TC, the load resistance RL is chosen such that $RL > Z_o$. Further, the output impedance of the transmitter circuit TC must be selected so as to be a value near that of the characteristic impedance $Z_o$ of the transmission line *L* for the purpose that the digital data can be transmitted with small delay time.

Assuming that the oscillator OSC, the transformer T and diodes $D_1$, $D_2$ are ideal elements, the output impedance between terminals 1 and 2 during the time the data signal is sent is as follows:

$$R_1 \cdot R_2/(R_1+R_2) \qquad (1)$$

and said output impedance becomes $R_2$ when the stray capacitance of the transmission line *L* discharges, because the diodes $D_1$ and $D_2$ become non-conducting. In the condition as shown below: that is, $$R_1 \cdot R_2/(R_1+R_2) > Z_o, R_2 > Z_o, R_L > Z_o$$

the output between the terminals 1 and 2 has the waveform as shown in FIG. 2D. As mentioned above, the output impedance between the terminals 1 and 2 is given by equation (1) for the outflow current, and by $R_2$ for the inflow current because the diodes $D_1$ and $D_2$ are in the non-conducting state, so that the waveform FIG. 2D has a rapid rise time but the falling portion has a trailing time as shown in this Figure. When the resistor $R_2$ is selected as a small value for the purpose of improving the falling characteristics of the waveform FIG. 2D, the output voltage of the transmitter circuit decreases, because the rectified output of the transmitter circuit is divided by the resistors $R_1$ and $R_2$. And when the values of the resistors $R_1$ and $R_2$ are selected as small values to maintain the ratio $R_1/R_2$ at a constant value, a large output power from the oscillator is required.

Referring to FIG. 3, in the transmitter circuit of the digital transmission circuit according to the present invention, a data signal shown in FIG. 2A is applied to the oscillator circuit OSC and the oscillator OSC is modulated by the data signal, and the modulated output signal shown in FIG. 2B is supplied via the transformer T to the full wave rectifier circuit. The output of the full wave rectifier circuit is divided by the series resistor $R_1$ and the parallel resistor $R_2$ and this divided output is transmitted to the transmission line *L*. As far as the resistor $R_2$, the transmitter circuit TC of the present invention has the same function as the conventional transmission circuit. In the present application, a collector and an emitter of a transistor Q are connected respectively to the terminals 1 and 2, and a diode $D_3$ is connected between the connection point of a base of the transistor Q and the parallel resistor $R_2$ and the emitter of the transistor Q. And the polarity of the diode $D_3$ is selected such that the forward direction of the diode $D_3$ coincides with the flow direction of the signal current.

In the above-mentioned circuit, when the rectified wave from the full wave rectifier circuit flows out from the terminals 1 and 2, the base of the transistor Q is reversely biased by the forward voltage drop in the diode $D_3$ due to the outflow current and then the transistor Q becomes non-conducting. In this case, as the forward voltage drop in the diode $D_3$ is very small, the value of the output impedance is given by equation (1) and this value is selected so that the output waveform has a steep rise time. Next, when the value of the rectified output of the full wave rectifier circuit becomes zero, the charge stored in the stray capacitance in the transmission line flows via the terminals 1 and 2. In this case, the diode $D_3$ is reversely biased by the inflow current, and the inflow current flows via the parallel resistor $R_2$ to the base of the transistor Q as the base current. As a result of this, $\beta$ times the base current ($\beta$ is the current amplification factor of the transistor Q) flows in the collector circuit of the transistor Q. Accordingly, the equivalent output impedance to the inflow current is:

$$R_2/(1+\beta) \qquad (2)$$

Thus, the necessary condition for maintaining the output impedance of the transmitter circuit TC at the constant value both to the outflow current and to the inflow current is:

$$R_1 \cdot R_2/(R_1+R)=R_2/1+\beta \qquad (3)$$

whence $$\beta R_1=R_2 \qquad (4)$$

When the values of the series resistor $R_1$ and the parallel resistor are selected to satisfy equation (4), the falling characteristics of the output waveform of the transmitter circuit is improved.

As mentioned above, when the data signal is transmitting, the transistor Q becomes non-conducting due to the forward voltage drop in the diode $D_3$, and when no signal is being transmitted, the base current flows in the base of the transistor Q. Then the equivalent value of the parallel resistor $R_2$ changes, and the output impedance of the transmitter circuit can be maintained always at the predetermined constant value. This is carried out automatically by the diodes $D_3$ and the transistor Q, and both the rising time and the falling time characteristics of the output waveform can be improved. FIG. 4B is the output waveform obtained experimentally in the present invention, and FIG. 4A is the output waveform obtained experimentally in the conventional circuit. Further, according to the present invention, the digital signal can be transmitted efficiently without decreasing the output signal voltage and without the necessity of increasing the output power of the oscillator.

What is claimed is:

1. A digital pulse signal transmission circuit comprising a transmission line of said circuit insulated from ground in which a digital data signal is applied to the oscillator circuit, said oscillator circuit being modulated by said digital data signal, the output of said oscillator circuit being supplied via a transformer to a full wave rectifier circuit, the output DC signal of said full wave rectifier circuit being divided by a series resistor and a parallel resistor, the output of said parallel resistor being transmitted to the transmission line, an active element connected between the terminals of said parallel resistor, a unidirectional switching means for controlling said active element during the time said output DC signal is sent, said unidirectional switching means producing a forward voltage drop, said forward voltage drop cutting off said active element, and during the time no DC output signal is sent said unidirectional switching means being cut off, and then said active element being put into a conductive state by a discharging current from the electronic charge stored in said transmission line.

2. A digital pulse signal transmission circuit according to claim 1, wherein said active element comprises a transistor and said unidirectional switching means comprises a diode.

3. A signalling circuit in which a pulse is transmitted from a transmission circuit across whose output a first resistance element is coupled and in series therewith a second resistance element is coupled, said pulse being transmitted from said output via a transmission line to a receiving circuit, comprising (a) a variable impedance switching means coupled in parallel with said first element and arranged to be non-conductive in response to outflow of current through said transmission line, and (b) a unidirectional switching means coupled to said variable impedance means and arranged to be conductive in response to said outflow whereupon it cuts off said variable impedance means, said unidirectional means being rendered non-conductive by reverse flow of current through said line whereupon said reverse flow renders said variable impendance means conductive.

* * * * *